United States Patent Office 3,143,411
Patented Aug. 4, 1964

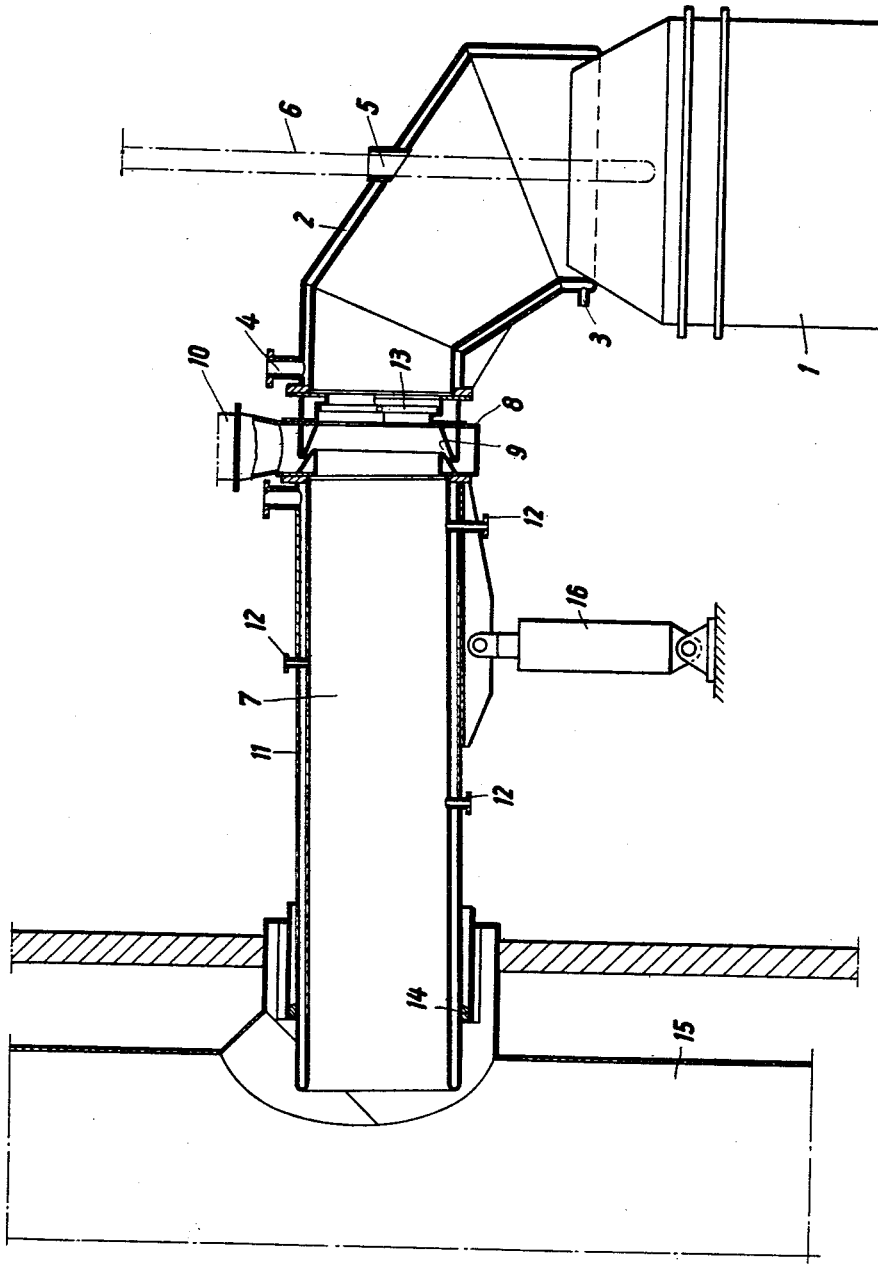

3,143,411
METHOD OF AND APPARATUS FOR LEADING OFF AND COOLING OF CONVERTER GASES
Hans Hoff, Essen-Bredeney, Germany, assignor to Beteiligungs- und Patentverwaltungsgesellschaft mit beschrankter Haftung, Essen, Germany, a corporation of Germany
Filed July 12, 1960, Ser. No. 42,319
Claims priority, application Germany July 18, 1959
7 Claims. (Cl. 75—28)

The present invention relates to a method of and apparatus for leading off and cooling of converter gases.

It is already known to feed converter gases to a dust removing device, particularly those gases created during the fining of pig-iron with oxygen, and hereby, to avoid the admixture and the burning of the combustible ingredients with air, in order to maintain, as low as possible, the quantity of gases the dust of which has to be removed.

In order to achieve this end, the gases led off the converter are caught by means of a cap mounted on the mouth formation of the converter and then fed to the dust removing device after cooling with spray water. This operation has the drawback that cooling by means of the spray water becomes effective only after expiration of a predetermined time period, since at first the water drops must be transformed into steam, so that only after a greater or shorter flow of the gases, depending upon the size of the drops, the full cooling effect is obtained. Furthermore, the cooling achieved, nearly exclusively, by a water injection requires great quantities of water in view of the high starting temperature of the gases led off the converter and brings about, therefore, a high humidity content of the gases and a correspondingly high dew-point, whereby the heating value of the gases is reduced and its quantities are undesirably increased.

It is, therefore, one object of the present invention to provide a method of leading off and cooling of converter gases, wherein these drawbacks are avoided by leading off and cooling of the gases from the converter with avoidance of air feed by using of a cap mounted on the mouth formation of the converter in such a manner that cooling gases are fed into the conduit in which the gases are removed. Preferably waste gases from blast furnaces are used for the cooling, which waste gases are suitably applied in a pre-purified state and at the conventional temperature of about 70° C. after the pre-purification. In addition, nitrogen could also be considered, which nitrogen is obtained during the oxygen production.

It is another object of the present invention to provide a method of leading off and cooling of converter gases, wherein by the admixture of the gases led off the converter with more or less purified waste gases, an immediately effective cooling is brought about. Simultaneously, or thereafter, cooling with spray water can also be provided, whereby, however, the water quantity and thereby also the humidity content of the gases is not to be measured greater than required for the dust removing process, as the circumstances require. The heat transfer of the gases to the conduit by spraying is further increased by the waste gases and, therefore, the indirect cooling by means of the conduit wall, is increased.

It is yet another object of the present invention to provide a method of and apparatus for leading off and cooling of converter gases, wherein the dew-point of the gases to be removed may be kept at a lower point by the application of blast furnace gases for the cooling than in the case of exclusive direct cooling with water. For instance, the dew-point of pure CO-gas is, in the case of a direct cooling by means of evaporation of water with a temperature of the gases of 1700° C., at about 83° C., and with additional indirect cooling of from 1700° C. to 1,000 ° C., at about 75° C. On the other hand, the dew-point of the gas mixture amounts to about 75° C. without indirect cooling by a mixture ratio of two parts of blast furnace gas and one part of converter gas, or, in case of a mixture ratio of ten parts of waste gas and one part of converter gas, about 50° C. In case of additional indirect cooling from 1700° C. to 1000° C., the corresponding dew-point values lie at about 67° C. and 42° C. In similar manner, the specific humidity of the gas mixture is naturally lowered and reaches in the mixture ratio of 10:1 about the value which the blast furnace gases had at the time of their entrance. Upon additional indirect cooling from 1700° C. to 1000° C., the specific humidity of the gas mixture is only 0.7 times of the specific humidity of the waste gases, in spite of the direct cooling. A low humidity of the gases led off brings about a higher heating value, as is well known. A lower dew-point permits lower operation temperatures of the dust removing device, for instance of the textile material filter and the dry electro-filter and thus constitutes an advantage.

It is a further object of the present invention to provide a method of and apparatus for leading off and cooling of converter gases, wherein the feeding of waste gases into the conduit for the gases led off is not interrupted during the stoppage of the blowing. The conduit for the gases to be led off is closed up against the outer atmosphere, in order to avoid detonations and explosions. The continuous feeding of waste gases has the advantage, that a continuously flowing energy carrier is available to the operator without requiring an intermediate storage thereof. Furthermore, it is also avoided that always at the start of the blowing, the gas to be removed enters an air filled conduit. The proposed cleaning of the entire conduit system with nitrogen, in order to avoid explosions, is then superfluous.

Since pre-purified blast furnace gas can be used in the process according to the present invention, the device for removing fine dust from the waste gas is correspondingly discharged and can have a smaller measurement. The dust removing device for the converter gases to be led off is better utilized than in the case of an interrupted operation. The coarser dust of the waste gases can be considered further as catch dust for the fine dust of the gases led off the converter.

With these and other objects in view, which will become apparent in the following detailed description, the present invention will be clearly understood in connection with the accompanying drawing, in which the only figure is an elevation, partly in section, of an apparatus adapted for leading off the gases obtained by blowing of oxygen on a pig-iron melt.

Referring now to the drawing, the apparatus comprises a converter 1 and the cap 2 is mounted on the converter 1, in order to catch the gases to be led off, in order to avoid the entrance of air and the burning of the gases with air, which gases consist to about 90% of CO. The cap 2 is water-cooled. The cooling water enters at the branch 3 and leaves at the branch 4. The cap 2 has an opening 5 through which an oxygen feeder 6, shown in point dotted lines, is sealingly inserted. An opening (not shown) may also be provided on the cap 2 for the feeding of added material, as well as another opening (not shown) from which a small quantity of gas may escape for the purpose of observation.

A feeding housing 8 for the waste gases is provided between the cap 2 and the conduit 7 for the gases to be led off, in which housing 8 the waste gases enter into the gas conduit through an annular slot 9, the waste gases being fed through the conduit 10. The conduit 7 for the gases to be led off is surrounded with a cooling water jacket 11 and equipped with connecting branches 12 for the water spray nozzles. A closing member formed as a water-cooled throttle damper 13 or as water valve or slide, is provided between the cap 2 and the gas conduit 7.

The gas conduit 7 is connected to the conduit 15, leading to the dust removing device, on the end opposite to that of the feeding housing 8 for the waste gases with a packing 14, which permits a swinging of the gas conduit 7. By the hydraulic or electric lifting device 16, the gas conduit 7 can be moved upwardly and downwardly, respectively, including the cap 2 and the feeding housing 8 for the waste gases.

The working of this apparatus takes place in the following manner:

Upon filling the pig-iron into the converter 1, the cap 2 is mounted on the converter by operation of the lifting device 16, whereby the cap 2 is closed up from the gas conduit 7 by the closed damper 13. Upon insertion of the blow feeder 6, oxygen is blown into the pig-iron bath, whereby the cap 2 is filled with the gases to be led off and the gas overflow can escape through a slot between the converter 1 and the cap 2. Upon opening of the damper 13, the gases to be led off flow into the conduit 7 whereby they are cooled by means of the waste gases entering through the slots 9. For further cooling, spray water is fed through the nozzles 12. The cooled gas mixture is then fed to the dust removing device through the conduit 15. Shortly prior to the termination of the blowing, the damper 13 is closed again, and upon termination of the blowing, the conduit 7 swings up with the cap 2 and the converter is tipped over. The waste gas continues to flow during that time into the conduit 7 and prevents by the overpressure the entrance of air into the conduit, possibly by leakiness of the closing damper 13.

While I have disclosed one embodiment of the present invention, it is to be understood that this embodiment is given by example only and not in a limiting sense, the scope of the present invention being determined by the objects and the claims.

I claim:

1. A method of leading off and cooling of converter gases by means of a cap mounted on the mouth of a converter and leading into a conduit, comprising the steps of
    feeding a stream of converter gases from a converter through a cap,
    feeding selectively said stream of converter gases from said cap into a conduit and throttling said stream of converter gases prior to their entrance into said conduit, respectively, and
    feeding cooling gases continuously into said conduit at a point downstream from said throttling point and selectively joining said stream of converter gases in said conduit during nonthrottling of said stream of converter gases and feeding solely said cooling gases into said conduit during throttling of said stream of converter gases at a point upstream of the point of entrance of said cooling gases.

2. The method, as set forth in claim 1, wherein said cooling gases are blast furnace gases and said feeding of cooling gases is performed during the blowing and non-blowing period.

3. An apparatus for leading off and cooling of gases from converters, comprising a converter having a mouth formation, a cap mounted on said mouth formation of said converter, a conduit for leading off gases from said converter connected with the free end of said cap, a closing member disposed between said cap and said conduit, a housing for feeding cooling gases into said conduit and disposed between said closing member and said conduit, and another conduit terminating in said feeding housing and feeding said cooling gases into said housing during the closed as well as open position of said closing member.

4. The apparatus, as set forth in claim 3, wherein said feeding housing defines an annular entrance slot at the point of connection with said first-mentioned conduit.

5. The apparatus, as set forth in claim 4, wherein said annular entrance slot is directed towards said closing member.

6. The apparatus, as set forth in claim 3, wherein said first-mentioned conduit has a plurality of connecting branches spaced apart from each other along the longitudinal axis of said first-mentioned conduit.

7. The apparatus, as set forth in claim 3, which includes a lifting device raising off said cap from and setting down the latter on, respectively, said converter, and means for swinging said first-mentioned conduit together with said feeding housing for said cooling gases out of its operative position, in order to disconnect said feeding housing from the free end of said cap.

References Cited in the file of this patent

UNITED STATES PATENTS

| | | |
|---|---|---|
| 86,247 | Phillips | Jan. 26, 1869 |
| 233,505 | Hall | Oct. 19, 1880 |
| 698,610 | Wills | Apr. 29, 1902 |
| 1,417,588 | Amburgh | May 30, 1922 |
| 1,866,824 | Sheridan | July 12, 1932 |
| 2,729,301 | Ekstrom | Jan. 5, 1956 |
| 2,803,450 | McFeaters | Aug. 20, 1957 |
| 2,831,467 | Guczky | Apr. 22, 1958 |
| 2,831,762 | Kemmetmuller | Apr. 22, 1958 |
| 2,855,292 | Vogt | Oct. 7, 1958 |
| 2,862,701 | McFeaters | Dec. 2, 1958 |

FOREIGN PATENTS

| | | |
|---|---|---|
| 772,632 | Great Britain | Apr. 17, 1957 |
| 1,020,355 | Germany | Dec. 5, 1957 |
| 972,340 | Germany | July 9, 1959 |